Feb. 24, 1942.  F. A. HOWARD ET AL  2,274,064
PREPARATION OF CARBON MONOXID-HYDROGEN GAS MIXTURES FOR HYDROGENATION
Filed Sept. 1, 1936  2 Sheets-Sheet 1

Frank A. Howard
Edward B. Peck  Inventors
By J. K. Small  Attorney

Patented Feb. 24, 1942

2,274,064

UNITED STATES PATENT OFFICE 2,274,064

PREPARATION OF CARBON MONOXID-HYDROGEN GAS MIXTURES FOR HYDROGENATION

Frank A. Howard and Edward B. Peck, Elizabeth, N. J., assignors to Standard Catalytic Company Application September 1, 1936, Serial No. 98,880

4 Claims. (Cl. 260—449)

This invention relates to improvements in the manufacture of gas mixtures suitable for use in the process of hydrogenating carbon oxides to form valuable commercial products, especially liquid hydrocarbons adapted for use as motor fuel. A particular object of the invention is to secure more economical operation by reforming the exit gases from the process to produce a cycle gas of regulated carbon monoxide and hydrogen content.

A further object of the invention is to reduce the burden of purifying the feed gases, which is now one of the most costly phases of the hydrogenation of carbon oxides.

A further object is to permit the utilization of low grade feed gases by supplementing them with a specially prepared high grade recycle gas.

Figure 1:
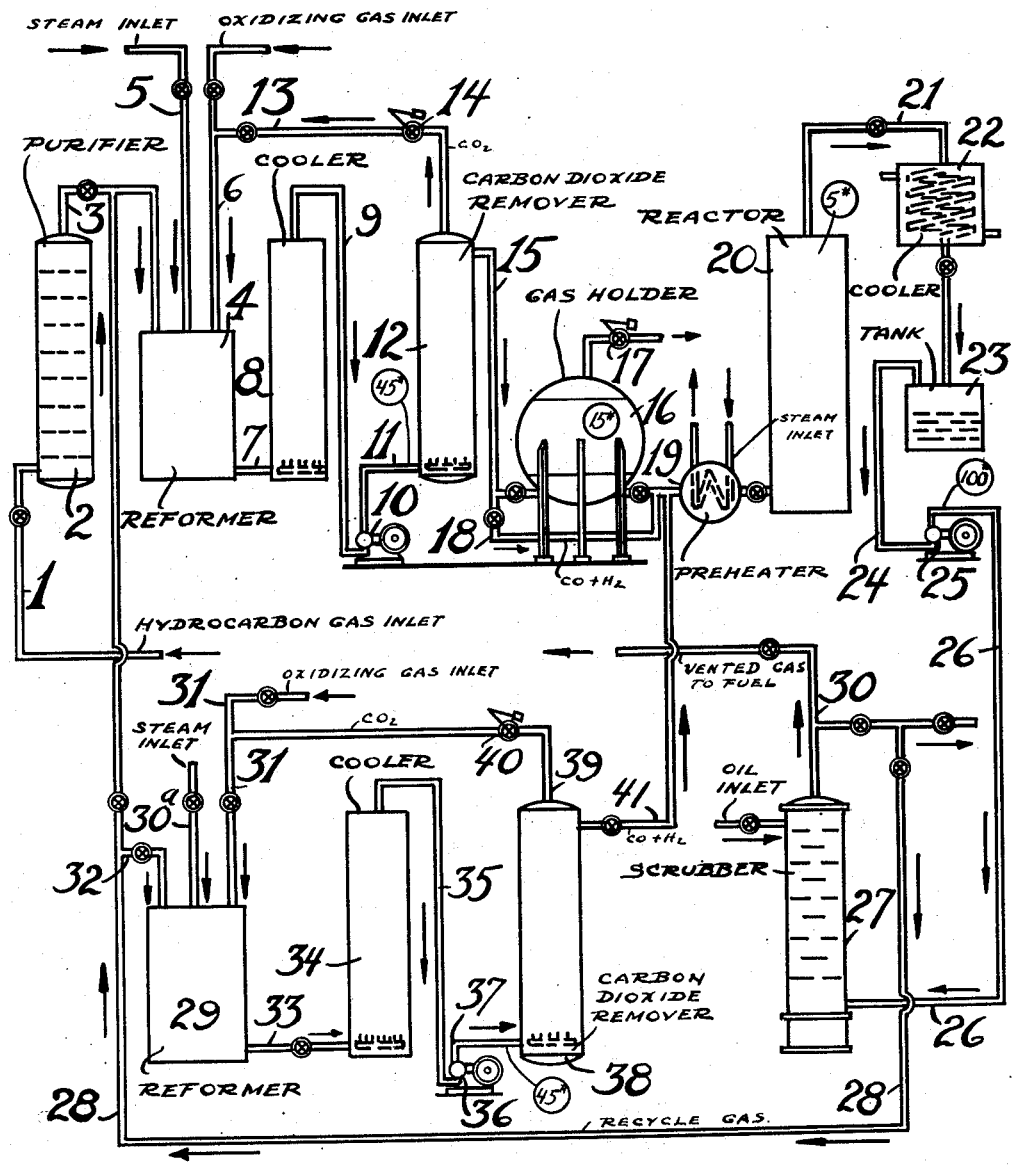
Figure 2:
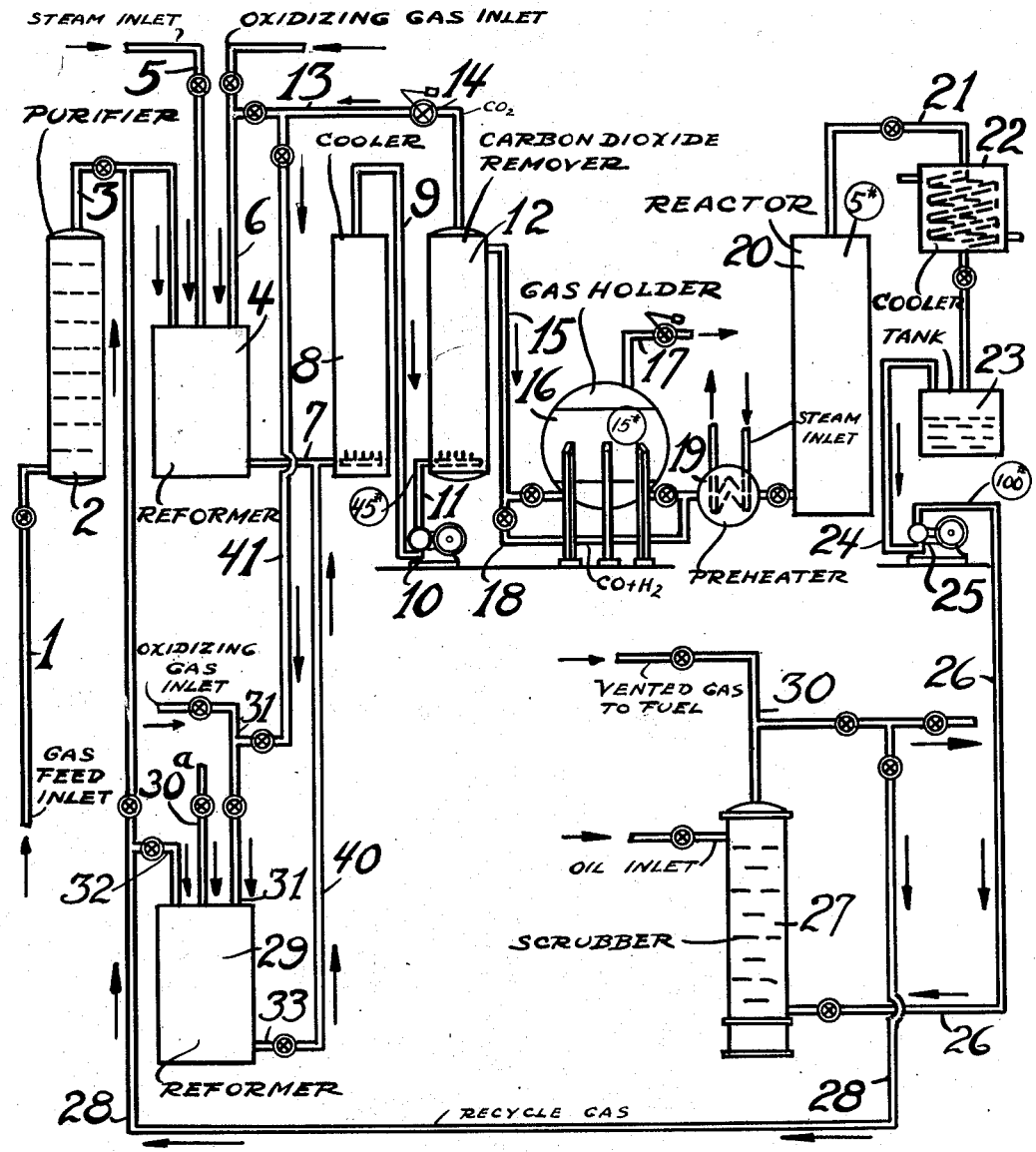

Various other objects and advantages of the invention will be apparent from the following description read in connection with the accompany drawings, in which Fig. 1 is a diagram showing a preferred arrangement of equipment for practicing the process and Fig. 2 is a diagram showing an anternative arrangement. Preferred pressures are indicated by figures in circles.

Referring to Fig. 1, numeral 1 denotes a line through which a suitable feed gas containing hydrocarbons is introduced. The feed gas will usually be natural gas, if it is available, since this affords large quantities of methane and other paraffin hydrocarbons at low cost and with little difficulty as to purification. However, the procedure described herein makes it feasible to use with greater advantage than heretofore, such comparatively low grade feed gases as those from the distillation of coal, coke oven gases, generator gases, and mixtures of these.

The feed gas is treated for removal of sulfur compounds by any of the usual methods, for example the sodium carbonate method, in the purifier 2. The purified gas flows through line 3 into the reformer 4, where it is processed with steam and/or oxidizing gases to produce gas containing carbon monoxide and hydrogen in substantially the ratio of 1 to 2. The reformer is best run at a high temperature, around 1600° F. and at about 15 lbs. pressure. Steam and oxidizing gas are introduced into the reformer through lines 5 and 6. The gases from the reformer flow through a line 7 into a cooler 8 where they pass counter-currently to water, or are cooled by other suitable means. The cooled gases flow through line 9 to a compressor 10, in which they are compressed to about 30–45 lbs. sq. in.

The compressed gas flows through line 11 into the carbon dioxide remover 12, where it passes counter-currently to a scrubbing liquid, such as triethanolamine, diaminopropanol, or the like. The carbon dioxide remover has a release line 13, in which there is a pressure release valve 14, through which carbon dioxide may be passed into line 6. The gas substantially freed from carbon dioxide is passed through line 15 into a storage tank 16, preferably of the spherical type having a release valve 17, or through the by-pass line 18 to a preheater 19.

The gas is heated in the preheater to about 385° F. before entering reactor 20. The pressure drop in the reactor is about 10 lbs. when operating between 385–410° F. to convert carbon monoxide and hydrogen to hydrocarbons and water, according to the equations:

(I) $\quad nCO + 2nH_2O = n(CH_2) + nH_2O$
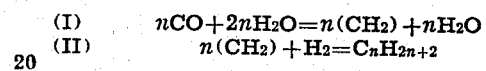
(II) $\quad\quad n(CH_2) + H_2 = C_nH_{2n+2}$ The hydrocarbons formed in this reaction include a wide range, from methane to high melting point wax. From 60 to 75% of the carbon is converted into liquid products. About 30% of the hydrocarbons are olefins consuming $2H_2$ for each CO and the remainder are paraffins requiring slightly more $H_2$.

The gases from reactor 20 flow through line 21 into a cooler 22 to condense water and normally liquid hydrocarbons, which flow into a tank 23. The residual gases are passed through line 24 into a compressor 25, where their pressure is raised to about 100-350 lbs. sq. in., and thence through line 26 into a scrubber 27 supplied with oil or other material adapted to absorb the normally liquid hydrocarbons present in the gas. Charcoal adsorption at low pressure may be used, if desired.

The gas from absorber 27 is passed through line 28 to a second reformer 29, except such part of the gas as is not required for this purpose; the excess flows through line 30 to fuel gas storage or utilization. The second reforming stage is an important part of the invention. In it the quantities of steam and/or oxidizing gases are controlled to produce carbon monoxide and hydrogen in ratios designed to supplement the product of reformer 4. A steam line 30a and oxidizing gas line 31 are provided for reformer 29. The feed gas enters through branch line 32. It may be passed directly into the main line 3 if the second reformer 29 is out of operation.

The oxidized gas from reformer 29 flows through line 33 into a cooler 34 and thence through line 35, compressor 36 and line 37, into a carbon dioxide remover 38. A line 39 with release valve 40, conveys carbon dioxide to the line 31. The gas containing carbon monoxide and hydrogen flows through line 41 to the preheater 19.

Fig. 2 illustrates an alternative method of carrying out the process in which the same cooler and carbon dioxide remover are used for both reformers. The numerals on Fig. 2 correspond to those on Fig. 1. In addition, numeral 40 designates a line by which products of reformer 29 leaving through line 33 are carried to line 7 and then introduced into cooler 8. Numeral 41 in Fig. 2 designates a line by which carbon dioxide leaving carbon dioxide remover 12 may be introduced into line 31 to serve as oxidizing gas for reformer 29.

To prevent building up the nitrogen content of the gas to an objectionable point by recirculation, a part of the gas is vented. The amount of venting required depends upon the nitrogen content of the initial gas and the permissible percentage of nitrogen in the total process gas. The following table shows the increased percentage of nitrogen in the synthesis gas for various percentages of venting when the initial gas contains 4% nitrogen:

| Percent vented | Percent N$_2$ in total process gas |
| --- | --- |
| 0 | 100 |
| 10 | 40 |
| 25 | 16 |
| 50 | 8 |
| 100 | 4 |

It is preferred to vent continuously 25–50% of the exit gases through line 30.

This invention enables the operator to balance the process without unduly increasing the diluent gas (nitrogen) and accomplishes this control by operating a reformer on 50–75% of the normally waste gas (tail gas) production. This is a great operating economy. In general, less than 25% of the total gas reforming is conducted on recycled gas.

Since ordinarily the sources of supply of gas do not give the correct proportions for the hydrogenation or synthesis step, the reforming operation is necessary. Many processes for preparing such gas mixtures are known and need not be described here. In general it may be said that the preferred reaction is that of hydrocarbons with steam, although other oxidizing agents, such as carbon dioxide and air or oxygen may be used at least in part. For best results the process should be operated to utilize as much as possible of the waste gas from reactor 20. In this way the burden of purification is lessened and also an economy in feed gas is effected.

An important feature of the invention is the ease with which the composition of the feed gas can be regulated. This is most conveniently effected by the use of the two reformers 4 and 29 each operated under its own optimum conditions, although the reformer 4 may be used alone. The adjustment of the carbon monoxide and hydrogen content of the feed and recycle gases, for obtaining improved results, will be as described, by way of example, in connection with the use of coke oven gas.

Such gas will ordinarily contain about 55% hydrogen, 25% methane, and 6% carbon monoxide, the remainder being carbon dioxide, nitrogen and other gases. This is reformed in the usual way by reaction with steam in the presence of a catalyst and gives a gas which is too rich in hydrogen for best results in the synthesis of hydrocarbons. The gas is brought to the proper composition by carrying out the conversion of the recycled gas under conditions to produce the maximum amount of carbon monoxide, as by substituting carbon dioxide for a part of the steam, and also by removing a part of the excess hydrogen present in the first stage by reacting it with recycled carbon dioxide.

This is accomplished by reforming the feed gas alone and the recycled gas alone, and commingling the products by passing them together through heat exchanger 19 into reactor 20. The carbon dioxide for adjusting the conditions in the two reformers is obtained, so far as possible, by recycling carbon dioxide from the scrubbers 12 and 38 by the lines 13 and 39. Additional carbon dioxide may be obtained from any suitable source, as from the furnace gases or elsewhere. It is usually better to have a slight excess of hydrogen over the one to two ratio and this may be effected by somewhat reducing the amount of carbon dioxide in the first stage.

Another example of the use of the improved process is in the conversion of natural gas to carbon monoxide and hydrogen. The process may be operated on the following quantities with results in general as stated in the following table:

| | Percent | | | | | | | Cubic feet |
| --- | --- | --- | --- | --- | --- | --- | --- | --- |
| | H$_2$O | H$_2$ | CO | CO$_2$ | CH$_4$ | N$_2$ | C$_n$H$_{2n}$ | |
| Inlet to reformer: | | | | | | | | |
| Natural gas | | | | | 92 | 4 | 4 | 595 |
| Steam | 100 | | | | | | | 686 |
| CO$_2$ | | | | 100 | | | | 361 |
| Outlet from reformer (after cooling) | | 60.4 | 29.7 | 7.1 | 1.4 | 1.4 | 0 | 2,600 |
| Outlet from CO$_2$ remover | | 65 | 32 | Trace | 1.5 | 1.5 | 0 | 2,420 |
| Outlet from reactor | 43 | 10 | 8 | 1.0 | 7.5 | 6.3 | 25.5 | 425 |
| Outlet from absorber (recycle gas) | | 22.3 | 18 | 2.2 | 20 | 11.8 | 25.7 | 170 |

Gas from outlet of absorber when reformed with steam gives 170 CF+steam=545 CF of gas of composition H$_2$ 62.5
CO 27.2
CO$_2$ 5.0 } which after CO$_2$ removal gives {
CH$_4$ 1.5
N$_2$ 3.8

515 CF of comp.
H$_2$ 66.0
CO 28.4
CH$_4$ 1.6
N$_2$ 4.0
―――
100.0

It is desirable to add a considerably greater quantity of carbon dioxide than is actually necessary for the reaction as this permits the furnace to be run at a lower temperature. The excess carbon dioxide can be taken out easily in the scrubbing stage. The cycle gas from processing the feed gas just described is reformed either separately or in the feed gas reforming stage under conditions to give the desired amounts of carbon monoxide and hydrogen to produce the desired approximate ratio of one to two.

The foregoing description is merely illustrative and various changes may be made within the scope of the appended claims, in which it is our intention to claim all novelty inherent in the invention as broadly as the prior art permits.

We claim:

1. In a process for synthesizing liquid hydrocarbons from carbon monoxide and hydrogen in which the ratio of hydrogen to carbon monoxide in the feed gas to the hydrocarbon synthesis reaction is adjusted to substantially a two to one ratio, the improvement which comprises supplying a fresh gas mixture of hydrogen and carbon monoxide, reforming at least a portion of the product gases leaving the said synthesis reaction with an oxidizing gas selected from the class consisting of steam, carbon dioxide and oxygen in a proportion adjusted to produce a reformed gas containing hydrogen and carbon monoxide in a ratio supplementing the ratio of hydrogen to carbon monoxide in said fresh gas, and mixing said reformed gas with said fresh gas to obtain said feed gas of substantially a two to one ratio of hydrogen to carbon monoxide.

2. In a process for synthesizing liquid hydrocarbons from a gas supply containing a ratio of hydrogen to carbon monoxide of about 2, the improvement which comprises providing a fresh gas mixture of hydrogen and carbon monoxide in which the said ratio is substantially greater than 2, reforming at least a portion of the product gases leaving the said synthesis reaction with an oxidizing gas selected from the class consisting of steam, carbon dioxide and oxygen in a proportion adjusted to produce a reformed gas containing hydrogen and carbon monoxide in a ratio supplementing the ratio of hydrogen to carbon monoxide in said fresh gas, and mixing said reformed gas with said fresh gas to provide said gas supply in the stated ratio.

3. An improved process for synthesizing hydrocarbon liquids comprising the steps of reacting fresh hydrocarbon gas with an oxidizing gas selected from the group consisting of steam, oxygen and carbon dioxide to produce a reformed gas mixture of hydrogen and carbon monoxide in which the ratio of hydrogen to carbon monoxide is substantially greater than 2, adding a reformed product gas mixture of hydrogen and carbon monoxide in which the said ratio is substantially less than 2 to the said first reformed gas in suitable proportion to bring the said ratio in the total mixture to about 2, subjecting this mixture to synthesis conditions in order to produce liquid hydrocarbons, separating gaseous products from the liquid so produced, and converting at least a portion of said gaseous products with an oxidizing gas selected from the group consisting of steam, oxygen and carbon dioxide in controlled proportions adjusted to produce the aforesaid other mixture of carbon monoxide and hydrogen which is added to the reformed gas.

4. An improved process for synthesizing hydrocarbon liquids comprising the steps of reacting fresh hydrocarbon gas with steam and carbon dioxide to produce a reformed gas mixture of hydrogen and carbon monoxide in which the ratio of hydrogen to carbon monoxide is substantially greater than 2, adding a reformed product gas mixture of hydrogen and carbon monoxide in which the said ratio is substantially less than 2 to the said first reformed gas in suitable proportion to bring the said ratio in the total mixture to about 2, subjecting this mixture to synthesis conditions in order to produce liquid hydrocarbons, separating gaseous products from the liquid so produced, venting a portion of the gaseous products from the system, converting the remainder with a mixture of steam and carbon dioxide in controlled proportions adjusted to produce the said second reformed product gas containing hydrogen and carbon monoxide in a ratio supplementing the ratio of hydrogen to carbon monoxide in said first reformed gas mixture, removing carbon dioxide from the reformed gases prior to the synthesis of the liquid hydrocarbons and adding a portion of this carbon dioxide to at least one of the gas mixtures before subjecting the same to the reforming treatment.

FRANK A. HOWARD.
EDWARD B. PECK.